UNITED STATES PATENT OFFICE.

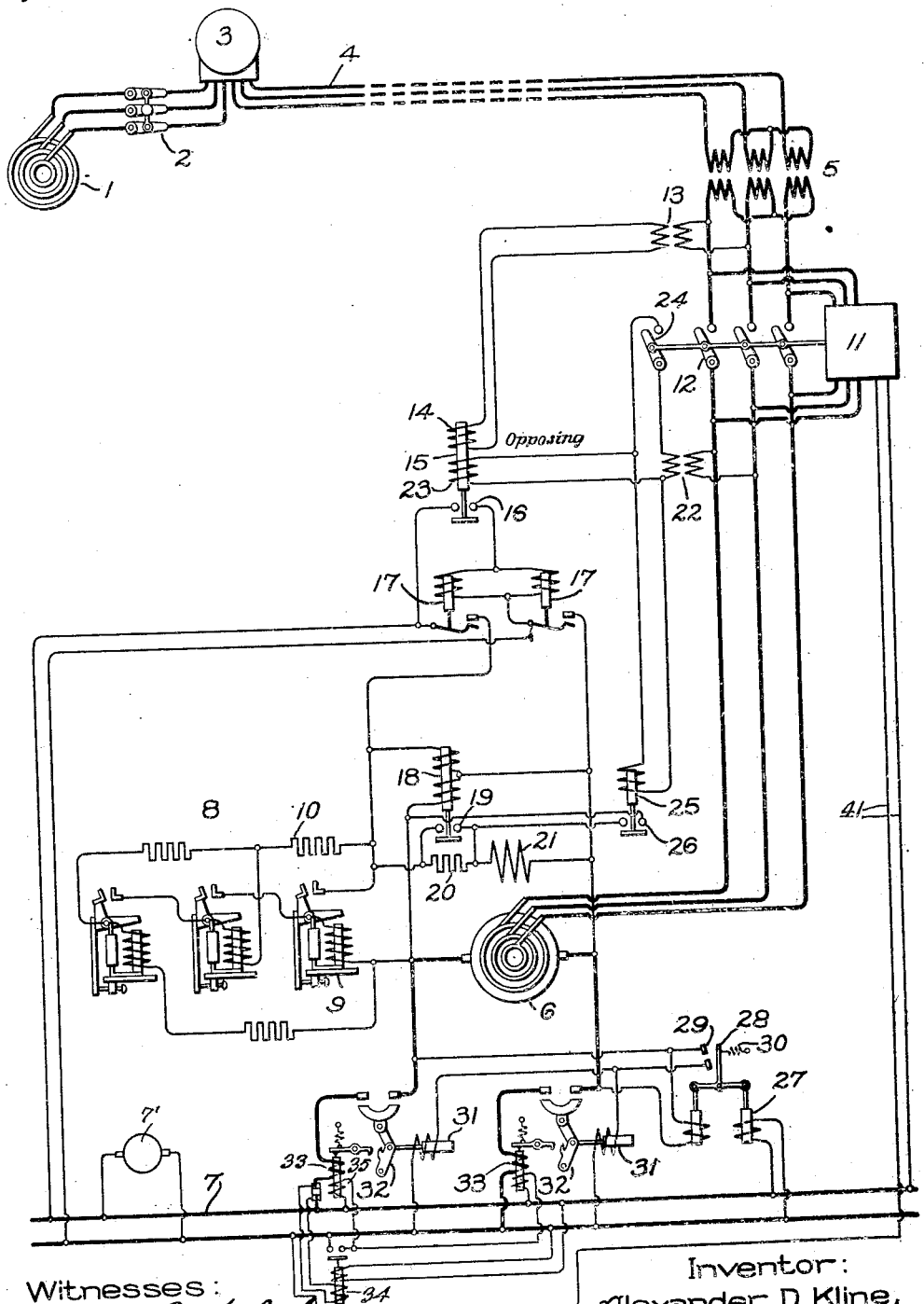

ALEXANDER DORN KLINE, OF SCHENECTADY, NEW YORK, ASSIGNOR TO GENERAL ELECTRIC COMPANY, A CORPORATION OF NEW YORK.

REMOTE CONTROL OF DYNAMO-ELECTRIC MACHINES.

1,258,419.  Specification of Letters Patent.  Patented Mar. 5, 1918.

Application filed June 12, 1914.  Serial No. 844,793.

*To all whom it may concern:*

Be it known that I, ALEXANDER D. KLINE, a citizen of the United States, residing at Schenectady, in the county of Schenectady, State of New York, have invented certain new and useful Improvements in Remote Control of Dynamo-Electric Machines, of which the following is a specification.

My invention relates to the remote control of dynamo electric machines, and more particularly rotary converters, and has for its object an improvement in the starting and control of such machines.

At the present time, it is customary to install such machines in sub-stations or even in main electric generating stations, and to have attendants for controlling them in the sub-stations in which they may be installed. The object of my invention is to provide a simple and efficient system of control whereby such machines may be installed in sub-stations remote from the main stations and be started and controlled from a distance so that it becomes no longer necessary to have attendants in the stations in which the machines are placed. I am aware that such remote control of these machines has been proposed, one of such systems, for example, being that shown in United States Patent No. 792,105, Woodbridge and Taylor, June 13, 1905. My invention is designed to be an improvement over such systems.

The novel features of my invention are pointed out with particularity in the claims which are affixed to and made a part of this specification.

For a further understanding of my invention, reference may be had to the accompanying drawing which shows diagrammatically the form of connections which I prefer to employ.

An alternating current source of supply 1 is here shown diagrammatically as a three-phase electric generator, although it is obvious that a generator supplying any number of phases may be employed. A switch 2 is provided for connecting the source of supply to the customary three-phase conductors in which I interpose some form of regulating device 3, such as the well known induction regulator, for regulating the voltage supplied by the alternating current source to the conductors 4. The generator and the voltage regulator, the switch which I have shown and other necessary switches, meters, circuit breakers, etc., which are commonly employed in such systems and which form no part of my invention so that I have not illustrated them, may be placed in the main station supplying the electric energy.

Electrical energy is supplied from this source to the dynamo electric machine which is to be controlled by conductors 4, and these conductors may be the only energy conductors passing between the main station and the sub-stations in which the machine or machines to be controlled are installed.

In the sub-station are shown transformers 5 connected up in the usual manner for lowering the voltage at which the electrical energy is supplied from the main station to the sub-station to a voltage suitable for operation with the rotary converter or other dynamo electric machine which it is desired to control. I have illustrated the dynamo electric machine which is to be controlled diagrammatically at 6 by showing it as a three-phase rotary converter or rotary transformer. A machine, however, of any number of phases may be employed if it be so desired.

At the bottom of the figure are shown conductors 7, which form a part of a direct current system to which the rotary converter is designed to furnish energy. It will be understood that this system is energized from some direct current source of electrical supply such as the generator 7', so that normally there will always be a direct current voltage impressed upon conductors 7. Such direct current systems are the well known so-called Edison systems, which are commonly used for the purpose of supplying electric energy.

In order to start the rotary converter, I employ an automatic starting device which will start the converter from the direct current system. While I may employ any well known automatic starting device for this purpose, I prefer to employ the device shown at 8, which in general consists of a plurality of series contactors 9 and resistances 10. This system of automatic starting has been described and claimed in a copending application of Edward J. Murphy, Serial No. 626,065, filed May 9, 1911, and the particular form of a contactor which I prefer to employ has been described and claimed by Edward J. Murphy in a copending application, 608,652, filed February 15, 1911. As this particular form of starting device, therefore, forms no part of my invention, except in so far as an automatic device may be employed, I shall not further describe the system or contactors used for starting the converter, except to state that it consists, as may be seen from an inspection of the drawing, of a plurality of contactors and resistances so arranged and connected to the converter that when current is supplied to the same, the current passes through the resistances in series with the armature of the converter. As the converter starts up and generates a counter electromotive force, the current flowing through its armature, and hence through the conductors in series therewith, will decrease, causing the contactors to close and cut out the resistances until the direct current side of the converter is connected directly to the direct current source of supply.

In order to connect the alternating current side of the converter to the transformers 5, I may employ an automatic synchronizer 11. These devices are well known, and, as they form no part of my invention, I have not illustrated the detailed features of the same. One such device which may be used is that shown in United States Patent No. 877,144, M. Vogelsang, synchronizing apparatus for alternators, January 21, 1908. This automatic synchronizer actuates the main switch 12 for connecting the converter to the secondary windings of the transformer 5. Connected across the secondary windings is also shown the auxiliary transformer 13 whose secondary winding energizes the coil 14 of a relay 15. When coil 14 is energized, the relay operates to connect contacts 16, thus energizing contactors 17 from the direct current system, these contactors in turn closing a direct current circuit to the converter through the automatic starting device 8 so that the same will operate to start the converter.

I have also provided a speed responsive device in the form of a counter-electromotive force relay 18. This relay, as shown, is provided with two windings, one of which is responsive to the voltage of the direct current system, while the other is responsive to the counter-electromotive force at the direct current terminals of the machine. As the machine is being started, the winding responsive to the voltage of the system will connect the contacts 19 and short circuit the resistance 20 which is connected in series with the shunt field winding 21. When the converter attains a certain speed, and, therefore, generates a predetermined voltage, the two windings of the relay will balance and remove the short circuit, thereby weakening the field of the machine and increasing its speed.

Connected between the converter and the switch 12, is shown a transformer 22 whose secondary winding energizes coil 23 on relay 15 when switch 24 is closed. When the winding 23 is energized, it operates to disconnect contacts 16, thus deënergizing contactors 17 and disconnecting the direct current side of the converter from the direct current system.

The secondary winding of transformer 22 also energizes relay 25, which when it is energized will close contacts 26.

Connected to the direct current side of the converter and also to the conductors 7 is shown the differential relay 27 having an arm 28 arranged to connect contacts 29 and operating against the action of a spring 30.

When these contacts are connected, the closing coils 31 of the circuit breakers 32 will be energized, thus closing circuit breakers 32 and directly connecting the direct current side of the converter to the direct current system. 33 are overload coils for opening the circuit breakers when the load upon the converter becomes too great. It is obvious that a reverse current relay or relays may be employed for disconnecting the direct current side of the converter from the direct current system if the direct current generated by the converter becomes too low. Such a reverse current relay 34 is shown diagrammatically as arranged to energize a trip coil 35, which is adapted to operate the same latch as the overload trip coil. When the reverse current relay operates, the contacts 40 carried thereby are closed, thereby energizing a circuit 41 leading to a trip coil in the automatic synchronizer 11, and this, in turn, will allow the switch 12 to open. In order not to complicate the drawing or the description of my invention, I have not illustrated the usual meters, disconnecting and other switches, etc., which are commonly employed for the operation and control of rotary converters, as any of the usual forms of such devices and of the manners for connecting the same to the various circuits may be employed.

The operation of my invention is as follows: When the rotary converter is not in use, it will normally be at rest, the switch 12 in the sub-station will be open and the switch 2 in the main station will also be open. If it be desired to start the converter so that it may supply energy to the direct current system, an attendant in the main station will normally actuate the voltage regulator 3 to give the minimum voltage so that the minimum voltage will be impressed upon conductors 4. This is not, however, absolutely essential. The switch 2 will then be closed, thus causing the alternating current generator 1 to supply energy to the transformers 5 in the sub-station inasmuch as there are no switches between the primary windings of the transformers and the main station. When the transformers 5 are energized, the auxiliary transformer 13 connected directly across the secondary windings of the main transformers, will be energized, thus energizing coil 14 of the relay 15, causing it to close contacts 16, thus energizing contactors 17 and impressing from the direct current system a direct current voltage upon the converter and the automatic starting device 8. This device will then start the converter from its direct current side by gradually cutting out resistance in series with its armature. The counter electromotive force relay 18 is energized when contactors 17 are closed so that this relay will connect contacts 19 and thus short-circuit resistance 20 in series with the shunt field 21 of the rotary converter. The converter will, therefore, start with full field. After all of the starting resistance in series with the armature has been cut out, then, owing to the counter electromotive force generated by the rotary, the counter electromotive force relay 18 will reverse its position, previously described, disconnecting contacts 19 and thus throwing resistance 20 in series with the shunt field 21 of the converter, causing the converter to increase its speed in the usual manner.

It will be obvious that after the converter has been started and because its field is separately energized from the direct current system, it will generate an alternating current voltage which will be of the proper polarity. When the correct phase relationship between the alternating current voltage generated by the converter and that supplied by the secondary windings of transformers 5 obtains, automatic synchronizer 11 will operate to close switch 12 and thus connect the alternating current side of the converter directly to the secondary windings of the transformers 5 so that the alternating current side of the converter will be energized therefrom.

When the automatic synchronizer 11 closes switch 12, it will also close switch 24, thus completing the circuit supplied by the secondary winding of transformer 22, with winding 23 of relay 15 and with the winding of relay 25. Winding 23 of relay 15 is arranged to oppose winding 14, so that when winding 23 is energized the relay will operate to open contacts 16, thus deënergizing contactors 17 and opening the circuit between the direct current side of the converter and the direct current system. Relay 25 operates to connect contacts 26, thus completing a circuit for the shunt field 21, so that the same will be energized by the converter, and thus there will be no deënergization of the same when contactors 17 are opened.

By observing the meters in the main station and manipulation of the voltage regulator 3 which is normally in the maximum voltage lowering position, the direct current voltage generated by the converter may be increased until the voltage becomes of the proper value to operate differential relay 27 and connect contacts 29, and thus close circuit-breakers 31 and connect the converter directly to the direct current system. The voltage regulator 3 may be then further manipulated, and also by observing the meters in the main station, the voltage so adjusted with the converter will supply the desired amount of energy to the direct current system.

When it is desired to stop the converter, the switch 2 in the main station may be opened. The speed of the converter will then tend to decrease and energy will be supplied to it from the direct current system. With a reversal of current, however, in the conductors connecting the converter to the direct current system, the reverse current relay will, in the usual manner, open circuit-breakers 31, thus disconnecting the converter from the direct current system. Also, as the contacts 40 are closed, the automatic synchronizer 11 will open switch 12 and disconnect the alternating current side of the converter from the secondary winding of tranformers 5. The converter will then no longer be connected either with the alternating current source of supply or with the direct current system and will come to rest. The automatic starting device will also be disconnected inasmuch as the auxiliary transformer 13 will be deënergized, and hence relay 15 will not operate to energize the automatic starting device.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, an alternating current system, a direct current system, one being a supply system and the other a distribution system, a rotary transformer, and automatic means operable upon the energization of the supply system for starting the transformer from the distribution system.

2. In combination, an alternating current source of supply, an alternating current system adapted to be connected to said source, a direct current system including a direct current source, a rotary transformer adapted to be electrically interposed between the alternating current system and the direct current system, and automatic means operable upon the energization of the alternating current system to start the transformer from the direct current system.

3. In combination, an alternating current source of supply, an alternating current system adapted to be connected to said source, a direct current system including a direct current source, a rotary transformer adapted to be electrically interposed between the alternating current system and the direct current system, and automatic means operable, upon the energization of the alternating current system, to start the transformer from the direct current system and to fix the polarity of said transformer.

4. In combination, an alternating current source of supply, an alternating current system adapted to be connected to said source, a direct current system including a direct current source, a rotary transformer adapted to be electrically interposed between the alternating current system and the direct current system, and automatic means operable, upon the energization of the alternating current system, to start the transformer by electrically connecting the direct current system thereto.

5. In combination, an alternating current source of supply, an alternating current system adapted to be connected to said source, a direct current system including a direct current source, a rotary transformer adapted to be electrically interposed between the alternating current system and the direct current system, automatic means operable upon the energization of the alternating current system to start the transformer from the direct current system, and automatic means operable when a desired relation obtains between an electrical condition of said transformer and of said alternating current system to connect said transformer to said alternating current system.

6. In combination, an alternating current source of supply, an alternating current system adapted to be connected to said source, a direct current system including a direct current source, a rotary transformer adapted to be electrically interposed between the alternating current system and the direct current system, and automatic means operable upon the energization of the alternating current system to start the transformer from the direct current system, automatic means operable when a desired relation obtains between an electrical condition of said transformer and of said alternating current system to connect said transformer to said alternating current system, and automatic means independent of said starting means for directly connecting the transformer to the direct current system.

7. In combination, an alternating current source of supply, an alternating current system adapted to be connected thereto, a direct current system, a rotary transformer, automatic starting means electrically interposed between the transformer and the direct current system, means operable upon the energization of the alternating current system for starting said automatic starting means, and means for connecting the transformer to the alternating current source.

8. In combination, an alternating current source of supply, an alternating current system adapted to be connected to said source, a direct current system, a rotary transformer, automatic means responsive to an electrical condition of the alternating current system for starting the transformer from the direct current system, means for connecting the transformer to the alternating current source, means independent of said starting means for directly connecting the transformer to the direct current system, and means actuated by said first-mentioned connecting means for disconnecting the automatic starting means.

9. In combination, an alternating current source of supply, an alternating current system adapted to be connected to said source, a direct current system, a rotary transformer, automatic means responsive to the voltage of the alternating current system for starting the transformer from the direct current system, automatic synchronizing means for connecting the transformer to the alternating source of supply when it is substantially in synchronism therewith, and means actuated by said synchronizing means for disconnecting the starting means.

10. In combination with a source of electrical energy, a supply circuit adapted to be connected thereto, a distribution circuit, a rotary transformer adapted to be connected between said circuit, automatic means operable upon the energization of said supply circuit for starting the rotary transformer from the distribution circuit, and automatic means operable when a predetermined relation exists between an electrical condition of the rotary transformer and the supply circuit to connect said transformer to the supply circuit and disconnect said starting means.

11. In combination, an alternating current source of supply, an alternating current system adapted to be connected to said source, a direct current system, a rotary transformer, automatic means responsive to an electrical condition of said alternating current system for starting the transformer from the direct current system, automatic synchronizing means for connecting the transformer to the alternating current system when it is substantially in synchronism therewith, and means actuated by the closure of said synchronizing means for disconnecting the starting means.

12. In combination with a source of electrical energy, a supply circuit adapted to be connected thereto, a distribution circuit, a rotary transformer adapted to be connected between said circuits, automatic means operable upon the energization of said supply circuit for starting the rotary transformer from the distribution circuit, automatic means operable when a predetermined relation exists between an electrical condition of the rotary transformer and the supply circuit to connect said transformer to the supply circuit and disconnect said starting means, and automatic means operable when a predetermined relation exists between an electrical condition of the rotary transformer and the distribution circuit to connect the rotary transformer to the distribution circuit to supply electrical energy thereto.

13. In combination, an alternating current source of supply, an alternating current system adapted to be connected to said source, a direct current system, a rotary transformer, automatic means responsive to an electrical condition of said alternating current system for starting the transformer from the direct current system, automatic synchronizing means for connecting the transformer to the alternating current system when it is substantially in synchronism therewith, means actuated by the closure of said synchronizing means for disconnecting the starting means, and means independent of said starting means for directly connecting the transformer to the direct current system.

14. In combination, an alternating current source of supply, a direct current system, a rotary transformer, automatic means arranged to be set in motion by the energization of said alternating current source for starting the transformer from the direct current system, means responsive to the speed of the transformer for weakening its excitation when a predetermined speed has been reached, means for automatically connecting the transformer to the alternating current source when it is substantially in synchronism therewith, and for disconnecting the starting means, and means independent of said starting means for directly connecting the transformer to the direct current system.

15. In combination, an alternating current source of supply, transformers having primary windings adapted to be energized thereby and secondary windings, means for connecting said transformers to said source, means for altering the voltage impressed upon said transformers from the source, a rotary converter, a direct current system, a device for starting the converter from the system by cutting out resistance in series with the converter armature circuit, a relay connected to the secondary windings of said transformers causing the operation of said device, means for increasing the speed of the rotary after said device has cut out substantially all of the resistance in series with the armature, an automatic synchronizing device connecting the rotary to the secondary windings of the transformers when it is substantially in synchronism therewith, means in operative relation with the synchronizing device for disconnecting the starting device upon the operation of said device, and means for connecting the converter directly to the direct current system when the converter voltage is substantially equal to that of the system.

16. In combination, an alternating current source of supply, an alternating current system adapted to be connected to said source, a direct current system including a direct current source, a rotary transformer adapted to be electrically interposed between the alternating current system and the direct current system, automatic means operable upon the energization of the alternating current system to start the transformer from the direct current system, automatic means operable when a desired relation obtains between an electrical condition of said transformer and of said alternating current system to connect said transformer to said alternating current system, and means responsive to the direction of the current flow between the transformer and the direct current system for effecting the disconnection of the transformer from the direct current system.

17. In combination, an alternating current source of supply, an alternating current system adapted to be connected to said source, a direct current system including a direct current source, a rotary transformer adapted to be electrically interposed between the alternating current system and the direct current system, automatic means operable upon the energization of the alternating current system to start the transformer from the direct current system, automatic means operable when a desired relation obtains between an electrical condition of said transformer and of said alternating current system to connect said transformer to said alternating current system, and means responsive to the direction of the current flow between the transformer and the direct current system for effecting the disconnection of the transformer from the alternating current system.

18. In combination, an alternating current source of supply, an alternating current system adapted to be connected to said source, a direct current system including a direct current source, a rotary transformer adapted to be electrically interposed between the alternating current system and the direct current system, automatic means operable upon the energization of the alternating current system to start the transformer from the direct current system, automatic means operable when a desired relation obtains between an electrical condition of said transformer and of said alternating current system to connect said transformer to said alternating current system, and means responsive to the direction of the current flow between the transformer and the direct current system for effecting the disconnection of the transformer from the direct current system and from the alternating current system.

In witness whereof, I have hereunto set my hand this 11th day of June, 1914.

ALEXANDER DORN KLINE.

Witnesses:
BENJAMIN B. HULL,
HELEN ORFORD.

Correction in Letters Patent No. 1,258,419.

It is hereby certified that in Letters Patent No. 1,258,419, granted March 5, 1918, upon the application of Alexander Dorn Kline, of Schenectady, New York, for an improvement in "Remote Control of Dynamo-Electric Machines," an error appears in the printed specification requiring correction as follows: Page 4, line 112, claim 10, for the word "circuit" read *circuits;* and that the said Letters Patent should be read with this correction therein that the same may conform to the record of the case in the Patent Office.

Signed and sealed this 4th day of June, A. D., 1918.

[SEAL.]

F. W. H. CLAY,

*Acting Commissioner of Patents.*

Cl. 171—118.